(12) United States Patent
Chen et al.

(10) Patent No.: US 7,154,239 B1
(45) Date of Patent: Dec. 26, 2006

(54) CONTROLLER FOR A BRUSHLESS DIRECT CURRENT MOTOR

(75) Inventors: Chien-Jung Chen, Kaohsiung Hsien (TW); I-Rong Liang, Kaohsiung Hsien (TW)

(73) Assignee: Yen Sun Technology Corp., Kaohsiung Hsien (TW)

( * ) Notice: Subject to any disclaimer, the term of this patent is extended or adjusted under 35 U.S.C. 154(b) by 0 days.

(21) Appl. No.: 11/439,133

(22) Filed: May 24, 2006

(30) Foreign Application Priority Data

Dec. 30, 2005 (TW) ............................... 94147507 A

(51) Int. Cl.
*H02P 23/00* (2006.01)
*H02P 31/00* (2006.01)
*H02P 1/18* (2006.01)
*H02P 7/06* (2006.01)

(52) U.S. Cl. ................ 318/254; 318/599; 318/129; 318/503; 318/134; 318/741; 318/760

(58) Field of Classification Search .................. None
See application file for complete search history.

(56) References Cited

U.S. PATENT DOCUMENTS

| | | | | |
|---|---|---|---|---|
| 4,359,674 A | * | 11/1982 | Gotou .......................... 318/254 |
| 4,962,354 A | * | 10/1990 | Visser et al. ................. 323/360 |
| 5,485,070 A | * | 1/1996 | Tominaga ..................... 318/696 |
| 5,682,067 A | * | 10/1997 | Manley et al. ............... 307/127 |
| 5,726,568 A | * | 3/1998 | Carbaugh et al. ....... 324/207.16 |
| 6,198,245 B1 | * | 3/2001 | Du et al. ..................... 318/471 |
| 6,841,960 B1 | * | 1/2005 | Yamada et al. .............. 318/468 |
| 6,965,219 B1 | * | 11/2005 | Brooks et al. ............... 323/282 |
| 7,109,691 B1 | * | 9/2006 | Brooks et al. ............... 323/282 |

* cited by examiner

*Primary Examiner*—Lincoln Donovan
*Assistant Examiner*—Renata McCloud
(74) *Attorney, Agent, or Firm*—Davidson Berquist Jackson & Gowdey, LLP

(57) ABSTRACT

A controller includes a power source unit, a drive circuit, and a state control circuit. The drive circuit is coupled to the power source unit, and includes a drive coil and a switching transistor unit. The switching transistor unit is operable in one of a circuit-making state for making an electrical circuit between the drive coil and the power source unit so as to enable the drive coil to drive rotation of a rotor of a brushless direct current motor, and a circuit-breaking state for breaking the electrical circuit between the drive coil and the power source unit. The state control circuit is coupled to the power source unit, and includes a pulse width modulator, a sensing coil, and a control transistor coupled electrically in series. The state control circuit controls operation of the switching transistor unit according to magnetic position of the rotor relative to the sensing coil.

6 Claims, 4 Drawing Sheets

CONTROLLER FOR A BRUSHLESS DIRECT CURRENT MOTOR

CROSS-REFERENCE TO RELATED APPLICATION

This application claims priority of Taiwanese application no. 094147507, filed on Dec. 30, 2005.

BACKGROUND OF THE INVENTION

1. Field of the Invention

The invention relates to a controller for a brushless direct current motor, more particularly to a controller that does not require Hall components to detect rotor position for current control of a brushless direct current motor.

2. Description of the Related Art

A brushless direct current motor generally includes a rotor having north and south magnetic poles, and a stator. By conducting electricity through coils on the stator, magnetic repulsion forces can be generated to drive the rotor to rotate. In a conventional motor driving circuit, a position sensing mechanism, such as a Hall IC, is adopted to determine positions of the north and south magnetic poles of the rotor so that the direction of electric currents flowing through the stator coils can be varied to ensure continuous rotation of the rotor.

FIG. 1 illustrates a conventional controller for a brushless direct current motor, which employs a sensing coil ($L_2$) instead of a Hall IC. The sensing coil ($L_2$) is used to sense magnetic position of the rotor (not shown), and controls on/off states of transistors ($Q_1$, $Q_2$) accordingly.

With further reference to FIGS. 2 and 3, assuming that the rotor is disposed such that the sensing coil ($L_2$) is able to sense a south magnetic pole (S) of the rotor, an electric current (as indicated by the solid arrow line in FIG. 1) is induced in the sensing coil ($L_2$), which triggers the transistor ($Q_2$) to conduct, thereby cutting-off the transistors ($Q_1$). At this time, electric current is unable to flow through a drive coil ($L_1$) on the stator, and magnetic repulsion forces for driving rotation of the rotor are not generated, thereby resulting in deceleration of instantaneous rotor speed. On the other hand, when the rotor is disposed such that the sensing coil ($L_2$) is able to sense a north magnetic pole (N) of the rotor, the transistor ($Q_2$) will be cut-off, whereas the transistors ($Q_1$) will conduct. At this time, electric current (as indicated by the dotted arrow line in FIG. 1) is able to flow through the drive coil ($L_1$) on the stator, and magnetic repulsion forces for driving rotation of the rotor are generated, thereby resulting in acceleration of the instantaneous rotor speed. By supplying electric current to the drive coil ($L_1$) only when the sensing coil ($L_2$) senses a specific magnetic pole (i.e., the north magnetic pole) of the rotor, the rotor could be controlled to rotate at a rated (average) speed.

However, the aforementioned conventional controller does not permit adjustments in the rated (average) speed. Moreover, as best shown in FIG. 3, in view of the large fluctuation in the instantaneous rotor speed, the rated (average) speed of the rotor is actually relatively low.

SUMMARY OF THE INVENTION

Therefore, the object of the present invention is to provide a controller for a brushless direct current motor, which incorporates pulse-width-modulation (PWM) techniques, to enable adjustment of the rated (average) speed of a rotor and to attain a relatively high rated (average) speed for the rotor.

According to the present invention, a controller for a brushless direct current motor comprises a power source unit, a drive circuit, and a state control circuit. The power source unit provides a direct current output. The drive circuit is coupled electrically to the power source unit, and includes a drive coil and a switching transistor unit coupled electrically to the drive coil. The switching transistor unit is operable in one of a circuit-making state for making an electrical circuit between the drive coil and the power source unit so as to enable the drive coil to drive rotation of a rotor of the brushless direct current motor, and a circuit-breaking state for breaking the electrical circuit between the drive coil and the power source unit. The state control circuit is coupled electrically to the power source unit, and includes a pulse width modulator, a sensing coil, and a control transistor coupled electrically in series. The control transistor is further coupled to the switching transistor unit. The state control circuit is operable in a first control state when the rotor is at a first magnetic position relative to the sensing coil, and in a second control state when the rotor is at a second magnetic position relative to the sensing coil. The state control circuit operates the switching transistor unit in the circuit-making state to result in continuous current flow through the drive coil when the state control circuit is operated in the first control state. The state control circuit operates the switching transistor unit to alternate between the circuit-breaking and circuit-making states to result in intermittent current flow through the drive coil when the state control circuit is operated in the second control state.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
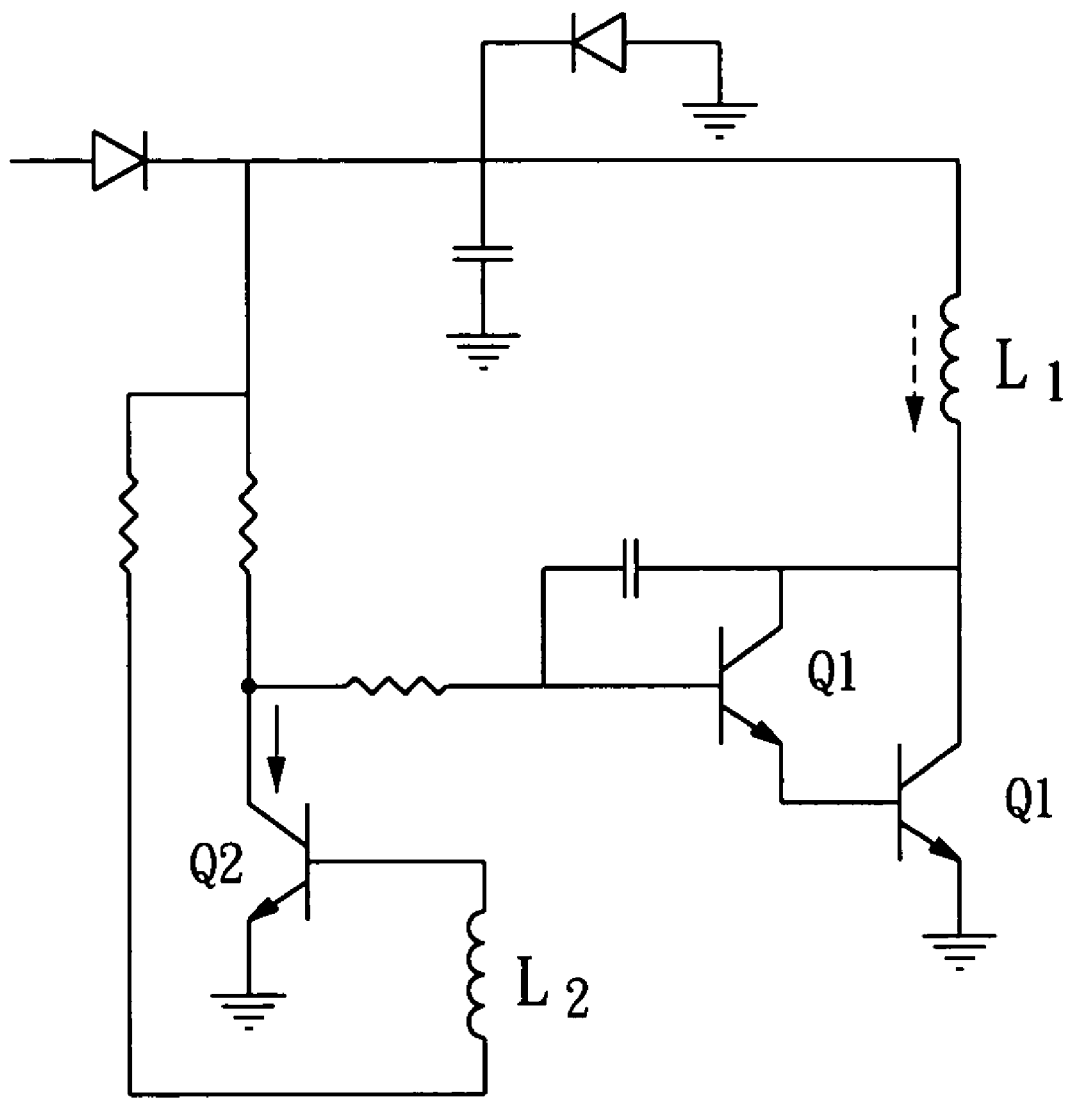
FIG. 1 is a schematic electrical circuit diagram of a conventional controller for a brushless direct current motor.
Figure 2:
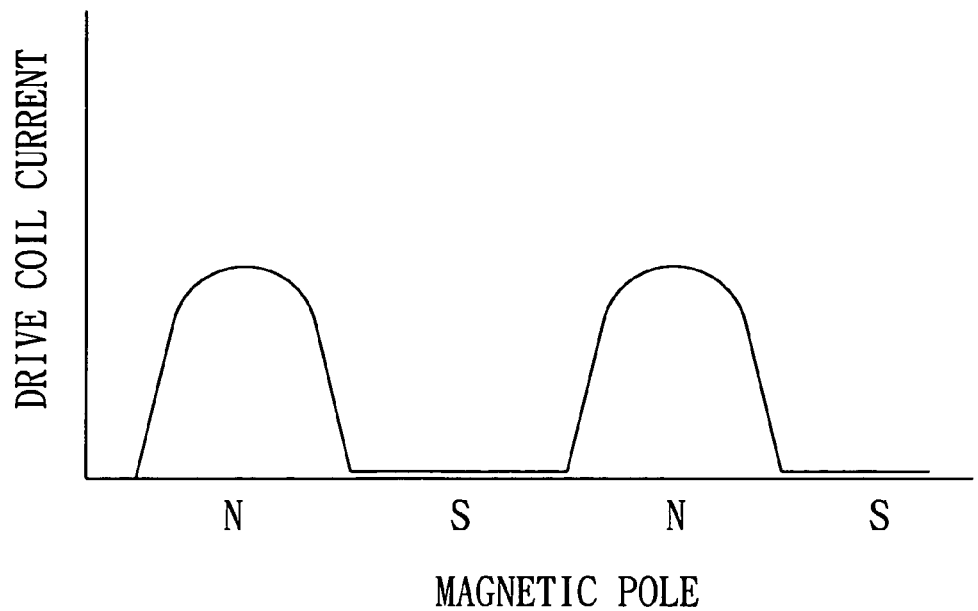
FIG. 2 is a plot to illustrate the relationship between drive coil current and magnetic pole position of a rotor as obtained using the conventional controller of FIG. 1.
Figure 3:
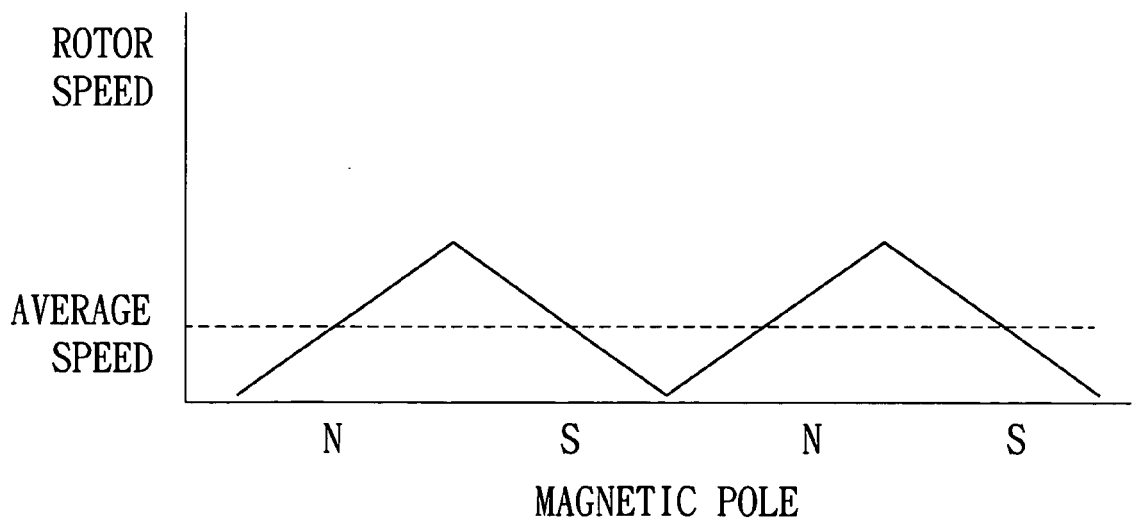
FIG. 3 is a plot to illustrate the relationship between speed and magnetic pole position of the rotor as obtained using the conventional controller of FIG. 1.
Figure 4:
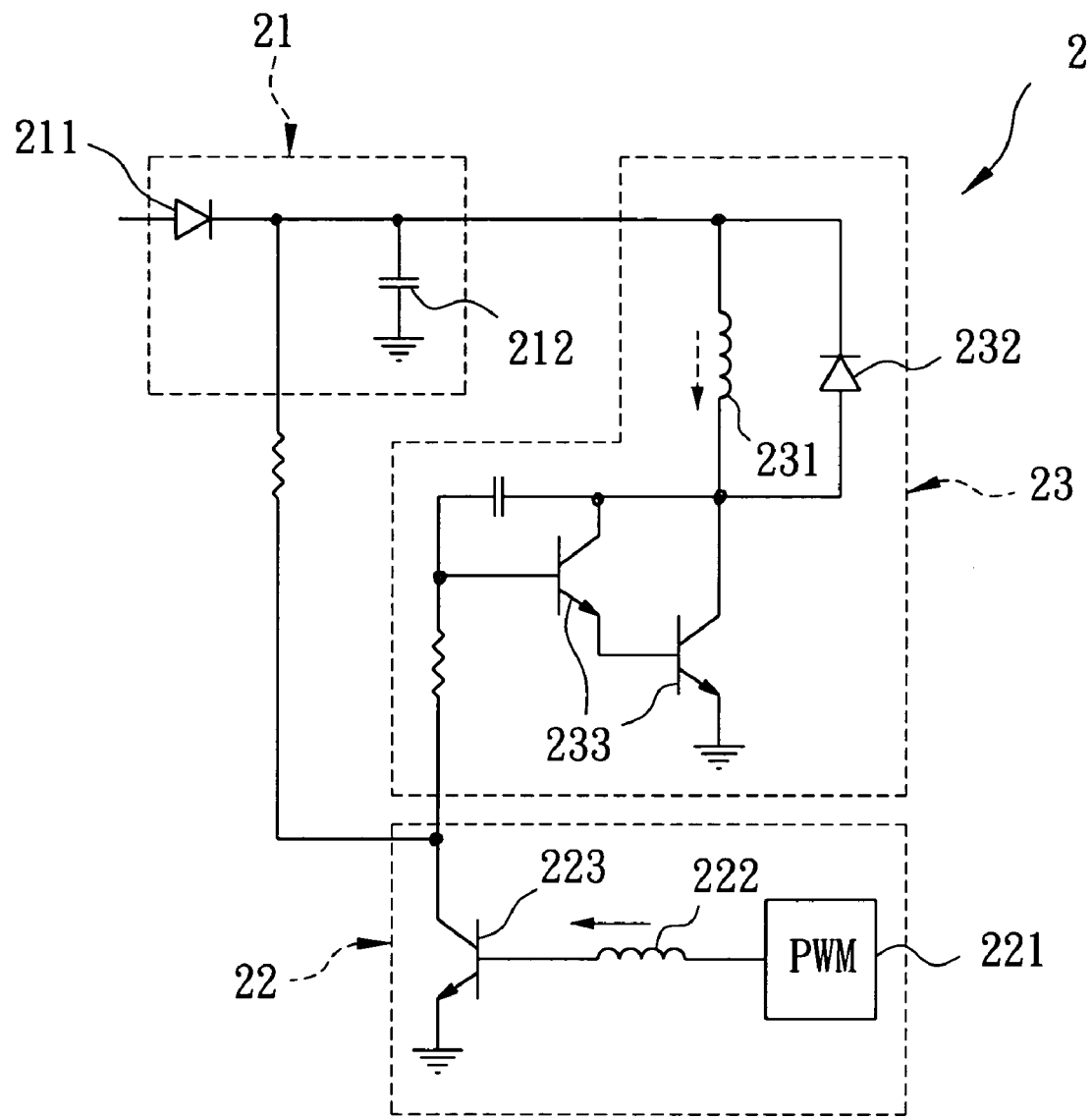
FIG. 4 is a schematic electrical circuit diagram of the preferred embodiment of a controller for a brushless direct current motor according to the present invention.

Referring to FIG. 4, the preferred embodiment of a controller 2 according to the present invention is adapted for generating magnetic repulsion forces to drive a rotor of a brushless direct current motor to rotate. The controller 2 includes a power source unit 21, a drive circuit 23, and a state control circuit 22.

The power source unit 21 provides a direct current output, which is a diode-rectified direct current output in this embodiment. In this embodiment, the power source unit 21 includes a diode 211 and a capacitor 212.

The drive circuit 23 is coupled electrically to the power source unit 21, and includes a drive coil 231 (which is wound on a stator of the motor), a switching transistor unit 233 coupled electrically to the drive coil 23, and a diode 232 coupled electrically across the drive coil 23. In this embodiment, the switching transistor unit 233, which has a compound transistor configuration, is operable in one of a circuit-making state for making an electrical circuit between the drive coil 231 and the power source unit 21 so as to enable the drive coil 231 to drive rotation of the rotor, and a circuit-breaking state for breaking the electrical circuit between the drive coil 231 and the power source unit 21. The diode 232 serves to protect the drive coil 231 from burnout by blocking reverse current flow.

The state control circuit 22 is coupled electrically to the power source unit 21, and includes a pulse width modulator (PWM) 221, a sensing coil 222, and a control transistor 223 coupled electrically in series. The control transistor 223 has a collector coupled to the power source unit 21 and the switching transistor unit 233, a grounded emitter, and a base coupled electrically to the sensing coil 222.

The state control circuit 22 is operable in a first control state when the rotor is at a first magnetic position relative to the sensing coil 222, and in a second control state when the rotor is at a second magnetic position relative to the sensing coil 222. In the following illustrative example, the rotor is at the first magnetic position when the sensing coil 222 is able to sense a north magnetic pole (N) of the rotor, and is at the second magnetic position when the sensing coil 222 is able to sense a south magnetic pole (S) of the rotor.

Figure 5:
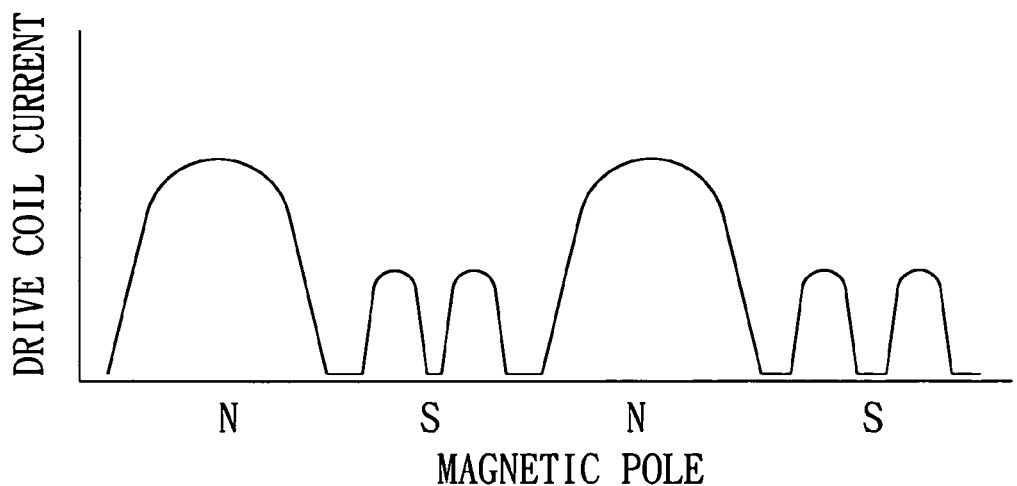
FIG. 5 is a plot to illustrate the relationship between drive coil current and magnetic pole position of a rotor as obtained using the controller of FIG. 4.
Figure 6:
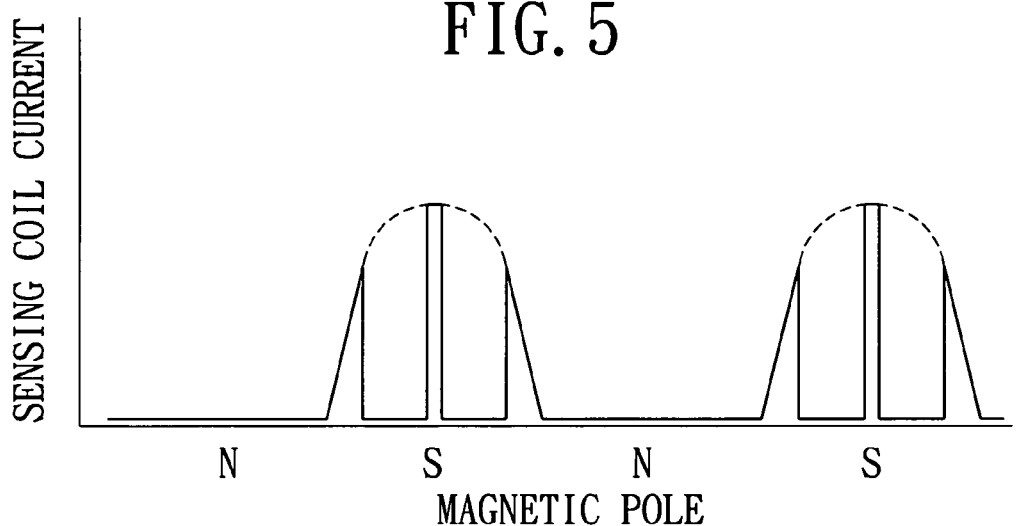
FIG. 6 is a plot to illustrate the relationship between sensing coil current and magnetic pole position of the rotor as obtained using the controller of FIG. 4.
Figure 7:
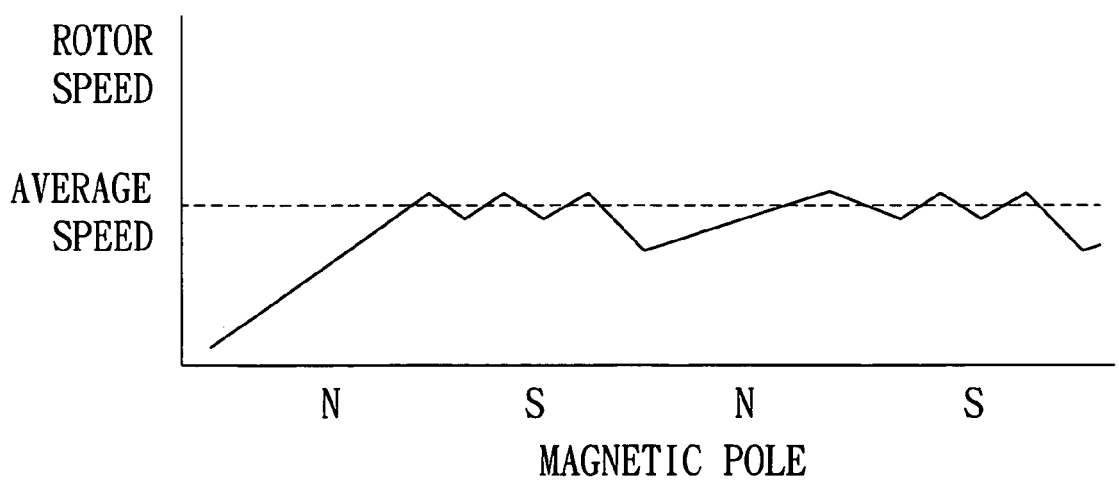
FIG. 7 is a plot to illustrate the relationship between speed and magnetic pole position of the rotor as obtained using the controller of FIG. 4.

With further reference to FIGS. 5 to 7, when the state control circuit 22 is operated in the first control state, electric current is not induced in the sensing coil 222, and the control transistor 223 is in a non-conducting state so that the state control circuit 22 operates the switching transistor unit 233 in the circuit-making state to result in continuous current flow (as indicated by the dotted arrow line in FIG. 4) through the drive coil 231. Therefore, magnetic repulsion forces for driving rotation of the rotor are generated to result in acceleration of the instantaneous rotor speed.

On the other hand, when the state control circuit 22 is operated in the second control state, electric current (as indicated by the solid arrow line in FIG. 4) is induced in the sensing coil 222, and the pulse width modulator 221 controls the control transistor 223 through the sensing coil 222 to switch the control transistor 223 between conducting and non-conducting states, thereby causing the switching transistor unit 233 to alternate between the circuit-breaking and circuit-making states. As a result, there is intermittent current flow through the drive coil 231 when the state control circuit 22 is operated in the second control state. In this manner, there is gradual deceleration in the instantaneous rotor speed, and the rated (average) speed of the rotor is thus relatively high in view of the smaller fluctuation in the instantaneous rotor speed, as best shown in FIG. 7, thereby promoting stability and smoothness of motor operation. Moreover, unlike the conventional controller described hereinabove, the rated (average) speed of the rotor can be controlled in the controller 2 of the present invention through adjustment of the frequency and duty cycle of the control output of the pulse width modulator 221, which results in adjustment of the frequency and duration of the conducting/non-conducting states of the control transistor 223 when the state control circuit 22 is operated in the second control state.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A controller for a brushless direct current motor that includes a rotor, said controller comprising:

a power source unit for providing a direct current output;

a drive circuit coupled electrically to said power source unit and including a drive coil and a switching transistor unit coupled electrically to said drive coil, said switching transistor unit being operable in one of a circuit-making state for making an electrical circuit between said drive coil and said power source unit so as to enable said drive coil to drive rotation of the rotor, and a circuit-breaking state for breaking the electrical circuit between said drive coil and said power source unit; and a state control circuit coupled electrically to said power source unit and including a pulse width modulator, a sensing coil, and a control transistor coupled electrically in series, said control transistor being further coupled to said switching transistor unit;

said state control circuit being operable in a first control state when the rotor is at a first magnetic position relative to said sensing coil, and in a second control state when the rotor is at a second magnetic position relative to said sensing coil;

wherein said state control circuit operates said switching transistor unit in the circuit-making state to result in continuous current flow through said drive coil when said state control circuit is operated in the first control state; and wherein said state control circuit operates said switching transistor unit to alternate between the circuit-breaking and circuit-making states to result in intermittent current flow through said drive coil when said state control circuit is operated in the second control state.

2. The controller as claimed in claim 1, wherein electrical current is induced in said sensing coil when the rotor is at the second magnetic position, and said pulse width modulator controls said control transistor through said sensing coil to switch said control transistor between conducting and non-conducting states to cause said switching transistor unit to alternate between the circuit-breaking and circuit-making states when said state control circuit is operated in the second control state.

3. The controller as claimed in claim 2, wherein said control transistor is in the non-conducting state to cause said switching transistor unit to operate in the circuit-making state when said state control circuit is operated in the first control state.

4. The controller as claimed in claim 1, wherein said power source unit provides a diode-rectified direct current output.

5. The controller as claimed in claim 1, wherein said drive circuit further includes a diode coupled electrically across said drive coil.

6. The controller as claimed in claim 1, wherein said control transistor has a collector coupled to said power source unit and said switching transistor unit, a grounded emitter, and a base coupled electrically to said sensing coil.

* * * * *